United States Patent [19]

Tominaga

[11] Patent Number: 4,720,569
[45] Date of Patent: Jan. 19, 1988

[54] CURING AGENT FOR THERMOSETTING RESIN PAINTS

[75] Inventor: Akira Tominaga, Hiratsuka, Japan

[73] Assignee: Kansai Paint Co., Ltd., Hyogo, Japan

[21] Appl. No.: 760,503

[22] Filed: Jul. 30, 1985

[30] Foreign Application Priority Data

Jul. 30, 1984 [JP] Japan ................ 59-157686

[51] Int. Cl.⁴ .................... C07C 125/073
[52] U.S. Cl. .................... 560/26; 560/16; 560/115; 560/148; 560/158; 106/287.25
[58] Field of Search .................. 560/26, 158

[56] References Cited

U.S. PATENT DOCUMENTS 2,802,022  8/1957  Groszos .................. 560/26
4,122,069 10/1978  Meyer .................... 528/93
4,160,077  7/1979  Brooks .................. 560/158

Primary Examiner—Michael L. Shippen
Attorney, Agent, or Firm—Wenderoth, Lind & Ponack

[57] ABSTRACT

A polycarbamic acid ester-type curing agent for thermosetting resin paints, said curing agent containing per molecule at least two groups represented by the following formula

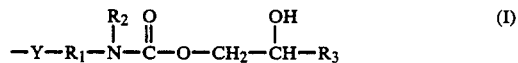

wherein Y represents

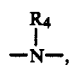

—O—, or —S—; $R_1$ represents a direct bond, or a divalent aliphatic hydrocarbon group having 1 to 6 carbon atoms which may be substituted by a hydroxyl group or an alkoxy group, provided that when Y is

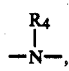

$R_1$ represents a direct bond; $R_2$ and $R_4$, independently from each other, represent a hydrogen atom, or an aliphatic hydrocarbon group having 1 to 6 carbon atoms which may be substituted by an amino group, a hydroxyl group or an alkoxy group, or a group of the formula

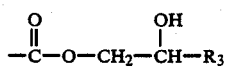

and $R_3$ represents a hydrogen atom or a monovalent aliphatic hydrocarbon group having 1 to 6 carbon atoms which may be substituted by a hydroxyl group or an alkoxy group.

8 Claims, No Drawings

CURING AGENT FOR THERMOSETTING RESIN PAINTS

This invention relates to a novel curing agent for thermosetting resin paints. More specifically, it relates to a polycarbamic acid ester curing agent being suitable for thermosetting corrosion-resistant paints and having improved low-temperature curability and corrosion resistance.

Blocked isocyanate curing agents obtained by protecting aromatic polyisocyanate compounds with blocking agents such as alcohols have previously been used in the largest amounts as curing agents for thermosetting corrosion-resistant paints such as cationic electrode-position paints. The essential defect of a cationic electrodeposition paint containing a curing agent of this type is that since the cure start temperature is high (usually at least about 180° C.), the polyisocyanate thermally decomposes at high temperatures to form isocyanate derivatives which generate gummy matter or soot; moreover, the isocyanate derivatives cause yellowing and bleeding of the top coat and inhibit its curing; and that a coated film formed from this paint has very inferior weatherability and is liable to undergo chalking. It has been strongly desired therefore to remove this defect.

Very recently, a modified epoxy resin obtained by introduction of carbamate ester groups formed by the reaction of an aliphatic primary or secondary (poly)amine with an alkylene carbonate (DE-OS No. 3246812) was proposed as a curing agent which replaces polyisocyanate curing agents and surpasses the polyisocyanate compounds in low temperature curability, low volatility and weatherability. These compounds are satisfactory to some extent as curing agents but still have insufficient corrosion resistance.

The present inventors have made investigations in order to remove the aforesaid defect, and have found that when the aforesaid carbamate ester groups are introduced into an epoxy resin through the intermediary of hetero atoms, they are markedly activated by the hetero atoms, and a curing agent free from the above defect can be obtained.

Thus, according to this invention there is provided a polycarbamic acid ester-type curing agent for thermosetting resin paints, said curing agent containing per molecule at least two groups represented by the following formula $$-Y-R_1-\underset{\underset{R_2}{|}}{N}-\underset{\underset{O}{\|}}{C}-O-CH_2-\underset{\underset{OH}{|}}{C}H-R_3 \qquad (I)$$

wherein Y represents $$-\underset{\underset{R_4}{|}}{N}-,$$

—O—, or —S—; $R_1$ represents a direct bond, or a divalent aliphatic hydrocarbon group having 1 to 6 carbon atoms which may be substituted by a hydroxyl group or an alkoxy group, provided that when Y is $$-\underset{\underset{R_4}{|}}{N}-,$$

$R_1$ represents a direct bond; $R_2$ and $R_4$, independently from each other, represent a hydrogen atom or an aliphatic hydrocarbon group having 1 to 6 carbon atoms which may be substituted by an amino group, a hydroxyl group or an alkoxy group, or a group of the formula $$-\underset{\underset{O}{\|}}{C}-O-CH_2-\underset{\underset{OH}{|}}{C}H-R_3$$

and $R_3$ represents a hydrogen atom or a monovalent aliphatic hydrocarbon group having 1 to 6 carbon atoms which may be substituted by a hydroxyl group or an alkoxy group.

In the active polycarbamic acid ester-type curing agent of this invention, the carbamate ester groups are introduced through the intermediary of hetero atoms represented by Y in formula (I), and are therefore activated by these hetero atoms. When this curing agent is mixed with a thermosetting resin paint and the mixture is heated to at least about 150° C., a urea linkage is formed between the carbamate ester group and an active primary or secondary amino group that may exist in the resin as shown by the following reaction formula (1) in accordance with the same reaction mode as ester-interchange reaction, or a urethane linkage is formed between the carbamate ester group and an active primary (especially amino alcoholic) hydroxyl group that may exist in the resin as shown by the following reaction formula (2) to provide a crosslinkage. Of course, it is also advantageous to introduce an acive amino group or a hydroxyl group into this curing agent itself to provide a self-curable resin.

$$-Y-R_1-\underset{\underset{R_2}{|}}{N}-\underset{\underset{O}{\|}}{C}-O-CH_2-\underset{\underset{OH}{|}}{C}H-R_3 + H-\underset{\underset{R_5}{|}}{N}- \xrightarrow{\text{heating}} \qquad (1)$$

$$-Y-R_1-\underset{\underset{R_2}{|}}{N}-\underset{\underset{O}{\|}}{C}-\underset{\underset{R_5}{|}}{N}- + HO-CH_2-\underset{\underset{OH}{|}}{C}H-R_3$$

$$-Y-R_1-\underset{\underset{R_2}{|}}{N}-\underset{\underset{O}{\|}}{C}-O-CH_2-\underset{\underset{OH}{|}}{C}H-R_3 + HO- \xrightarrow{\text{heating}} \qquad (2)$$

$$-Y-R_1-\underset{\underset{R_2}{|}}{N}-\underset{\underset{O}{\|}}{C}-O- + HO-CH_2-\underset{\underset{OH}{|}}{C}H-R_3$$

Furthermore, the curing agent of this invention is intrinsically self-curable without the introduction of an active amino group or a hydroxyl group, and when it is heated as shown by the following reaction formula (3), the carbamate ester groups together form a urethane linkage and/or a urea linkage and it can cure by itself. Hence, the curing agent of this invention can also be used as a resinous binder for thermosetting resin paints.

$$-Y-R_1-\underset{\underset{R_2}{|}}{N}-\underset{\underset{O}{\|}}{C}-O-CH_2-\underset{\underset{OH}{|}}{C}H-R_3 + \qquad (3)$$

$$HO-\underset{\underset{R_3}{|}}{C}H-CH_2-O-\underset{\underset{O}{\|}}{C}-\underset{\underset{R_2}{|}}{N}-R_1-Y- \xrightarrow{\text{heating}}$$

-continued

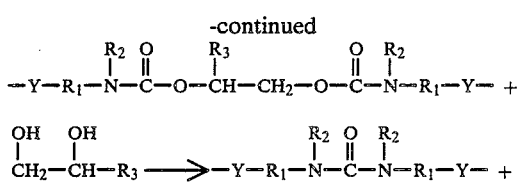

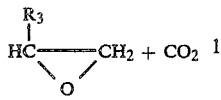

In the reaction formulae (1), (2) and (3), Y, $R_1$, $R_2$ and $R_3$ are the same as defined above, and $R_5$ represents a hydrogen atom or an organic residue.

As is clear from the reaction formulae (1), (2) and (3), a paint composition containing the curing agent of this invention does not liberate an isocyanate compound or its derivative during thermal decomposition and therefore does not adversely affect the top coat. Another advantage is that an aromatic urethane linkage or an aromatic urea linkage is not brought into the crosslinkage, and the weatherability of the coated film is not impaired.

A thermosetting resin paint containing the curing agent of this invention has a lower curing temperature than a thermosetting resin paint containing a polyisocyanate compound, and does not always require a curing catalyst. To rcure the coated paint relatively rapidly at a temperature lower than about 170° C., it is advantageous to use about 0.1 to 3% by weight, calculated as metal, of a known curing catalyst, for example a compound of a heavy metal such as lead, tin, iron and zinc, especially a lead or tin compound. Typical examples of the metal compound are lead salts of acids such as sulfuric acid, silicic acid, acetic acid, lactic acid, 2-ethylhexanoic acid, lauric acid, naphthenic acid and tall oil fatty acid, and tin compounds such as dibutyltin diacetate, dibutyltin laurate and dibutyltin oxide.

The "divalent aliphatic hydrocarbon group having 1 to 6 carbon atoms which may be substituted by a hydroxyl group or an alkoxy group" represented by $R_1$ in formula (I) conveniently may be a hydrocarbon group moiety constituting hydroxy-aliphatic primary amine or mercapto-aliphatic primary amine molecules. Specific examples include linear or branched alkylene groups having 1 to 6 carbon atoms. Specific examples of the divalent aliphatic group for $R_1$ are —$CH_2CH_2$—, —$CH_2CH_2CH_2$—, —CH$_2$CH—, —CH$_2$CH$_2$CH$_2$CH$_2$—, —CHCH$_2$CH$_2$—,
  |                                |
  CH$_3$                            CH$_3$ —CH$_2$CHCH$_2$—, —CH$_2$CH$_2$CH$_2$CH$_2$CH$_2$—, and
  |
  CH$_3$

—CH$_2$CH$_2$CH$_2$CH$_2$CH$_2$CH$_2$—.

Alkylene groups having 1 to 3 carbon atoms such as —$CH_2CH_2$—, —$CH_2CH_2CH_2$— and —$CH_2CH_2CH_2CH_2$— are especially preferred as $R_1$. $R_1$ is also preferably a direct bond.

When a polyepoxide compound in which epoxy groups have been introduced through the intermediary of a hetero atom (O, S) is used as a starting material for the production of the curing agent, $R_1$ may be one derived from the epoxy group, for example

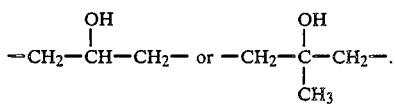

The aliphatic hydrocarbon group having 1 to 6 carbon atoms, preferably 1 to 3 carbon atoms, represented by $R_2$ in formula (I) may have an amino group, a hydroxyl group or an alkoxy group as a substituent, and is preferably an alkyl group. Specific examples include methyl, ethyl, propyl, isopropyl, hydroxyethyl, aminoethyl and methoxyethyl groups.

$R_3$ in formula (I) is a hydrogen atom, or an aliphatic hydrocarbon group containing 1 to 6 carbon atoms, preferably 1 to 3 carbon atoms which may contain a hydroxyl group or an alkoxy group as a substituent. Examples of the aliphatic hydrocarbon group are alkyl groups having 1 to 6 carbon atoms, preferably 1 to 4 carbon atoms, such as methyl, ethyl, propyl, isopropyl, butyl, sec-butyl, isobutyl and tert-butyl. Of these, the hydrogen atom and a methyl group are preferred as $R_3$.

More specifically, the active polycarbamate ester-type curing agent containing at least two groups of formula (I) per molecule is preferably the reaction product of the following three components, i.e.

(a) a hydrazine compound or an active amino compound represented by the following formula

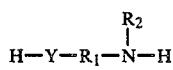

wherein Y, $R_1$ and $R_2$ are the same as defined above, and having at least two active hydrogen atoms, (b) a polyepoxide compound, and (c) an alkylene carbonate represented by the following formula

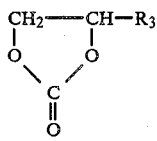

wherein $R_3$ is the same as defined above, or the reaction product of the following three components, i.e.

(a) an active amino compound represented by the following formula

wherein $R_2$ is the same as defined above, (b) a polyepoxide compound having at least 2 groups of the following formula

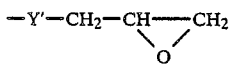

wherein Y' represents —O— or —S—, and (c) an alkylene carbonate represented by the following formula

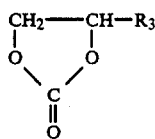

wherein R$_3$ is the same as defined above.

Typical examples of the carbamate ester groups of formula (I) are shown below.

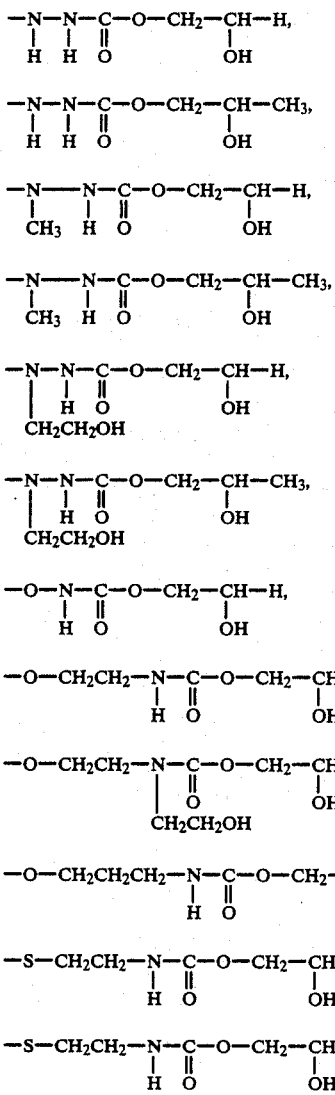

The active carbamate ester-type curing agent can be produced with industrial advantage by any of the following manufacturing processes.

[Process I]

The active hydrogens of the hydrazine or active amino compound (a) are reacted with the polyepoxide compound (b) to introduce aliphatic amino groups, and then the product is reacted with the alkylene carbonate (c). Advantageously, the primary group is temporarily protected by, for example, ketiminization or aldiminization, and then reacted with the polyepoxide compound (b).

By taking up the use of the hydrazine as an example, this reaction is schematically shown as follows:

Reaction scheme I

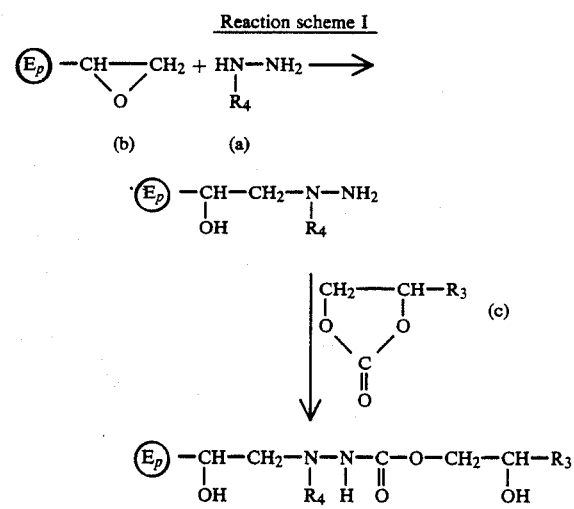

In the formula $(E_p)$ represents a skeletal portion of the polyepoxide compound (although for simplicity only one epoxy group is indicated in formula (b), it should be understood that at least one other epoxy group is bonded to $(E_p)$; and R$_4$ is the same as defined above.

When the hydroxy-aliphatic primary amine or mercapto-aliphatic primary amine of the following formula HO—R$_1$—NH$_2$ or HS—R$_1$—NH$_2$ wherein R$_1$ is the same as defined, is used as the active amino compound, it is possible to carry out the reaction between the hydroxyl group or mercapto group in the chain and the above epoxide compound after the primary amino groups is temporarily protected by, for example, ketiminization or aldiminization. This reaction is schematically shown below by taking up the hydroxy-aliphatic primary amine as an example.

Reaction scheme II

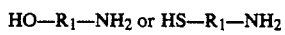
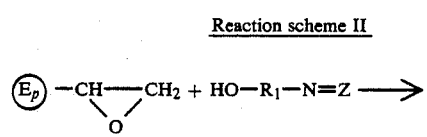
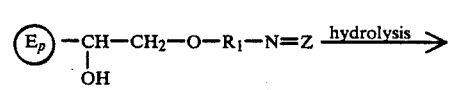
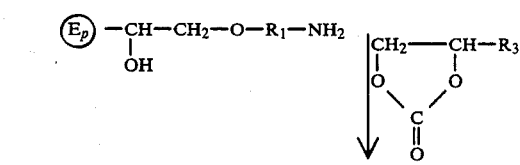
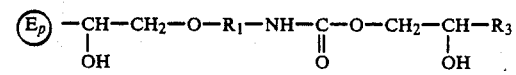

In the formulae, Z represents a ketimine or aldimine protective group, and $(E_p)$, R$_1$ and R$_3$ are the same as defined above.

[Process II]

The active amino group of the hydrazine or active amino compound (a) is reacted with the alkylene carbonate (c) to convert it to a carbamate ester group, and the remaining active hydrogen is reacted with the polyepoxide compound (b). This reaction is shown as follows by taking up an example of using the hydrazine.

Reaction scheme III

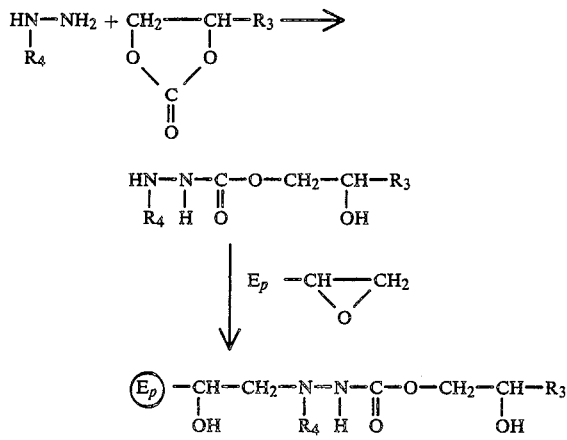

In the formulae, $E_p$, $R_3$ and $R_4$ are the same as defined above.

The unit reactions shown by reaction schemes I, II and III do not at all require a catalyst, and can be carried out at a relatively low reaction temperature ranging from room temperature to about 200° C. The reactions proceed almost quantitatively. A solvent may be used in the reactions. When the reaction product is used as a water-base paint, water and alcoholic solvents may be advantageously used.

Examples of the hydrazine or active amino compound (a) are given below.

(1) Hydrazines

Hydrazine, methylhydrazine and hydroxyethylhydrazine.

(2) Aminoalkanols such as 2-aminoethanol, 3-amino-1-propanol, 2-amino-2-methyl-1-propanol, 2-amino-1-butanol and 5-amino-1-pentanol.

(3) Aminoalkylmercaptans such as 2-aminoethylmercaptan.

(4) Hydroxylamine (5) Ammonia and aminoalkanes such as monomethylamine and monoethylamine.

The polyepoxy compound used in the above reaction is a compound having at least two epoxy groups

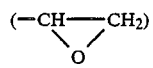

on an average per molecule. Generally, compounds having polyepoxy a number average molecular weight of at least 100, preferably 200 to 2,000, more preferably 250 to 1,000, are suitable. Polyepoxy compounds known per se may be used. Examples include polyglycidyl ethers of polyphenols which can be produced by reacting polyphenols with epichlorohydrin in the presence of alkalies. Examples of the polyphenols which can be used are bis(4-hydroxyphenyl)-2,2-propane, 4,4'-dihydroxybenzophenone, bis(4-hydroxyphenyl)-1,1-ethane, bis(4-hydroxyphenyl)-1,1-isobutane, bis(4-hydroxy-tert-butylphenyl)-2,2-propane, bis(2-hydroxynaphthyl)methane, 1,5-dihydroxynaphthalene, bis(2,4-dihydroxyphenyl)methane, tetra(4-hydroxyphenyl)-1,1,2,2-ethane, 4,4'-dihydroxydiphenyl ether, 4,4'-dihydroxydiphenylsulfone, phenyl novolaks and cresol novolaks. Polyepoxy compounds obtained by reacting diglycidyl ethers with the aforesaid polyphenols and reacting the products further with epichlorohydrin can also be used.

Other useful polyepoxy compound include polyglycidyl ethers of phenolic novolak resins and polyglycidyl ethers of polyhydric alcohols. Examples of the polyhydric alcohols include ethylene glycol, diethylene glycol, triethylene glycol, 1,2-propylene glycol, 1,4-propylene glycol, 1,5-pentanediol, 1,2,6-hexanetriol, glycerol and bis(4-hydroxycyclohexyl)-2,2-propane.

Other polyepoxide compounds include alicyclic glycidyl ethers [for example polyglycidyl ethers such as bis(4-hydroxycyclohexyl)-2,2-propane and bis(4-hydroxycyclohexyl)methane], aromatic glycidyl amines [such as 4,4'-diglycidyl amino diphenyl methane, diglycidyl aminophenol and m-xylylene bis(diglycidylamine)], aromatic or alicyclic plolycarboxylic acid glycidyl esters (such as glycidyl esters of isophthalic acid, terephthalic acid, trimellitic acid, tetrahydrophthalic acid and hexahydrophthalic acid), and epoxidized polycycloalkenes.

Those polyepoxy compounds which are especially suitable for producing the polycarbamic acid ester-type curing agent are polyglycidyl ethers of polyphenols having a number average molecular weight of at least about 100, preferably about 200 to about 2,000, and an epoxy equivalent of 50 to 2,000, preferably 100 to 1,000, and especially preferably epoxy resins represented by the following general formula

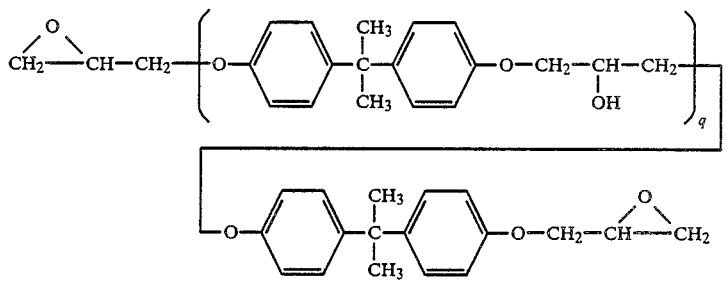

in which q is 0 to 4.

When an active compound of the following formula

wherein $R_2$ is as defined hereinabove, such as ammonia, methylamine, ethylamine or hydroxyethylamine, is used in the production of the curing agent of this invention, a polyepoxide compound into which a groups of the following formula

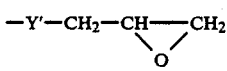

wherein Y' is the same as defined above, is introduced, namely the epoxy group is introduced through the intermediary of a hetero atom, is used as the polyepoxide compound.

Examples of the alkylene carbonate of the following fromula

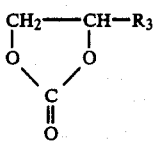

wherein $R_3$ represents hydrogen atom or a hydrocarbon group having 1 to 6 carbon atoms, preferably 1 to 3 carbon atoms, which may be substituted by a hydroxyl group and/or may be interrupted by an ether linkage, include ethylene carbonate, propylene carbonate, glyceryl carbonate, styrene carbonate and butylene carbonate.

When the polycarbamate ester-type curing agent obtained by this invention is used as a curing agent for a thermosetting resin paint, its amount is preferably such that the number of carbamate ester groups is at least equivalent to the number of the active primary or secondary amino groups (and hydroxyl groups) of the film-forming resin in the paint.

The polycarbamate ester-type curing agent of this invention has self-curability under heat, and can be used as a binder for a cationic electrodeposition paint. In this case, an amino group is introduced into the curing agent by a known method, or the curing agent is mixed with a resin binder having an amino group introduced thereinto. Subsequent neutralization with an organic or inorganic acid such as acetic acid, lactic acid and phosphoric acid gives an aqueous dispersion which is used as the resinous binder. The amount of the amino group introduced can be freely adjusted depending upon the water-dispersibility of the resinous binder. Advantageously, the content of the amino groups is generally 10 to 200, preferably 20 to 100, in terms of an amine value (milligrams of KOH per gram of resin).

The curing agent of this invention may contain a hydroxyl group. The content of the hydroxyl group is generally 25 to 1,000, preferably 50 to 500, in terms of a hydroxyl value (mg KOH/g).

Preferably, neutralization is carried out by using 0.1 to 0.7 equivalent of the acid. The pH of the resulting aqueous dispersion is generally 3 to 9, preferably 5 to 7, and the resin concentration is generally 3 to 30% by weight, preferably 5 to 15% by weight.

As desired, a pigment is added to the aqueous dispersion. Any pigments which are usually employed in electrodeposition paints can be used. Examples include colored pigments such as red iron oxide, titanium white and carbon black; extender pigments such as talc, clay and mica, and rustproof pigments such as chromate salts, strontium chromate and basic lead silicate. The amount of the pigment is optional.

If desired, a small amount of a known surface-active agent (for example, a nonionic surface-active agent) usually employed in cationic electrodeposition paints may be added to the composition of this invention.

Electrodeposition coating of the aqueous dispersion on articles may be carried out by methods and appratuses which have normally been used for cationic electrodeposition coating. Desirably, an article to be coated is used as a cathode and a stainless steel plate or a carbon plate, as an anode. There is no particular restriction on the electrodeposition coating conditions. Generally, the electrodeposition is desirably carried out with stirring under the following conditions.

Bath temperature: 20° to 30° C.
Voltage: 100 to 400 V (preferably 200 to 300 V).
Current density: 0.01 to 3 A/dm².
Time during which a current was passed: 1 to 5 minutes
Ratio of the area of the anode to that of the cathode: 2:1 to 1:2.
Distance between the electrodes: 10–100 cm.

The coated film deposited on the article as a cathode can be cured by first washing it and then baking it at about 150° to about 180° C.

The curing agent of this invention may also be used as a solvent-base baking paint composition by diluting it with an ordinary organic solvent.

The following Examples illustrate the present invention more specifically.

EXAMPLE 1

Seventy-five parts (1 mole) of 3-aminopropanol and 120 parts (1.2 moles) of methyl isobutyl ketone were dehydrated under reflux until no water distilled out. 174 Parts (solids content 157 parts) of the resulting ketimine (as a 90% methyl isobutyl ketone solution) was added to a solution of 180 parts of phenol novolak glycidyl ether (epoxy equivalent about 180, melting point about 40° C.) and 69 parts of ethylene glycol monobutyl ether, and they were reacted at 150° C. until the water-soluble amine value (*1) of the product dropped below 2. The reaction mixture was then cooled to 90° C., and 88 parts of ethylene carbonate and 17 parts of water were added and the reaction was carried out at 80° C. until the total amine value of the reaction product became below 3. Thus, an active polycarbamate ester-type curing agent (bi- to tri-functional; the calculated functional group content 343) was formed.

(*1): The amine value (mg KOH/g of solids of the sample) of the aqueous layer obtained by dissolving the sample in a mixture of xylene, butanol and ethanol (1:1:1 by volume) and extracting the mixture with the same amount of a saturated aqueous solution of sodium chloride.

EXAMPLE 2

Seventy-seven (77 parts) of 2-aminoethyl mercaptan was dissolved in 73 parts of ethylene glycol monoethyl ether, and 102 parts of propylene carbonate was added dropwise at 40° C. After the generation of heat ended, the reaction was carried out until the total amine value of the product became substantially zero. Then, 190 parts of the same bisphenol A diglycidyl ether as used in Example 1 was added, and reacted at the same temperature until the epoxy value of the product became substantially zero. Thus, an active polycarbamate-type curing agent (bifunctional, the calculated functional group equivalent about 370) was obtained.

Performance test

190 Parts of bisphenol A epichlorohydrin-type epoxy resin (epoxy equivalent about 950; trade name Epon 1004, a product of Yuka Shell Co., Ltd.) was dissolved in 140 parts of a mixture of ethylene glycol monobutyl ether and methyl isobutyl ketone in a weight ratio of 1:1, and 21 parts of diethanolamine was added. They were reacted at 110° C. until the tertiary amine value of the product reached 52. Thus, a resinous binder (amine value 53, active hydroxyl group equivalent about 530) was obtained. Eighty parts of each of the active polycarbamate ester-type curing agents obtained in Examples 1 and 2 was mixed with 20 parts (solids content) of the resin binder, and 26 parts of lead 2-ethylhexanoate (Pb content 38%) was added. The mixture was coated on a zinc phosphate-treated cold-rolled steel plate, and baked at 165° C. for 30 minutes to prepare a coated film having a thickness of 20 to 25 microns. The coated steel sheet was tested for the following properties, and found to be acceptable by the following standards.

(1) Resistance to solvent wiping (methyl isobutyl ketone): More than 20 times.

(2) Impact strength (Du Pont method): ½ inch 0.5 kg, at least 50 cm.

(3) Salt spray resistance (JIS Z-2371): More than 800 hours.

(4) Two-coat accelerated weatherability (*): More than 4 cycles.

(*) A top coat clear paint of the aminoalkyd type was coated to a thickness of 20 to 30 microns, and the crosscut adhesion (delamination strength) of the coated film was tested by a cycle consisting of 80 hour exposure to Sun Shine Weather-Ometer and 72 hour water resistance test at 40° C.

EXAMPLE 3

Monoethanolamine (61 parts; 1 mole) and 117 parts (1.17 moles) of methyl isobutyl ketone were heated under reflux and reacted until no water distilled out. The resulting ketimine (as a 90% methyl isobutyl ketone solution; 160 parts=1 mole) was added to a mixture of 418 parts (1.1 moles) of bisphenol A diglycidyl ether (epoxy equivalent 190) and 136.8 parts (0.6 mole) of bisphenol A. The resulting mixture was reacted at 140° C. until the epoxy value of the product dropped substantially to zero. The reaction mixture was then cooled to 90° C., and 69.1 parts (0.2 mole) of an isophorone diisocyanate/dimethylaminoethanol (1:1 by mole) adduct (90% methyl isobutyl ketone solution) prepared in advance was added, and reacted until the isocyanate vlaue of the product was lowered to zero. The product was then diluted with 151 parts of ethylene glycol monobutyl ether, and 36 parts of water was added to hydrolyze the ketimine at 80° C. for 3 hours. Then, 79.2 parts (0.9 mole) of ethylene carbonate was added, and reacted at 80° C. until the amine value of the product decreased to 22. As a result, an active polycarbonate ester-type curing agent (self-curing) having a resin solids content of 73.5% and a theoretical functional group equivalent of 841) was obtained.

EXAMPLE 4

Ethylene carbonate (88 parts) was added little by little at 40° C. to 95 parts (1 mole) of hydroxyethyl hydrazine (80% ethylene glycol monoethyl ether solution), and reacted at 60° C. until a decrease in amine value stopped.

66.6 parts (0.3 mole) of isophorone diisocyanate was added to 82.5 parts (0.15 mole) of caprolactone diol (hydroxyl group equivalent about 275), and they were reacted at 60° C. until the isocyanate value of the product became 84.5. Then, 380 parts (1 mole) of bisphenol A diglycidyl ether (epoxy equivalent 190) and 131 parts (0.575 mole) of bisphenol A were added, and they were reacted at 120° C. until the isocyanate value of the product decreased to zero. The reaction product was dissolved in 173 parts of ethylene glycol monobutyl ether, and polymerized at 130° C. in the presence of 0.33 part of dimethylbenzylamine as a catalyst until the epoxy value of the product decreased to 1.74.

The hydroxyethyl hydrazine/ethylene carbonate reaction product obtained above was added to the polymerization product and they were reacted at 110° C. until the epoxy value of the product decreased to 0. The reaction mixture was cooled to 90° C., and 44.45 parts (0.15 mole) of diethylenetriamine methyl isobutyl ketone diketimine (90% methyl isobutyl ketone solution) was added, and the mixture was reacted until the water-soluble amine value of the product decreased to below 2 to prepare an active carbamate ester-type curing agent (self curing) having a resin solids content of 81.5% and a theoretical functional group equivalent of 864.

EXAMPLE 5

102 parts (1 mole) of propylene carbonate was added little by little to 50 parts (1 mole) of hydrazine monohydrate at 40° C. and they were reacted until the generation of heat ceased and the amine value of the product decreased to 234. Separately, 380 parts (1 mole) of bisphenol A diglycidyl ether (epoxy equivalent 190) was dissolved in 110 parts of ethylene glycol monobutyl ether, and 35 parts (0.33 mole) of diethanolamine was added. The mixture was reacted at 90° C. until the water-soluble amine value of the product decreased to below 1. Then, the above hydrazine/ethylene carbonate reaction product was added, and reacted until the epoxy value of the product became substantially zero. Thus, an active carbamate ester-type curing gent (self-curing) having a resin solids of 81.1% and a theoretical functional group equivalent of 549 was obtained.

Performance test

To each of the self-curable active polycarbamate ester-type curing agent obtained in Examples 3 to 5 was added 3.3 parts per 100 parts of the polymer of lead 2-ethylhexanoate (Pb content 30%). 50 to 60% of the amino groups were neutralized with acetic acid, and the product was dispersed in water to give an aqueous dispersion having a solids content of 15%. The aqueous dispersion was coated by electrodeposition on a zinc phosphate-treated cold-rolled steel plate, and baked at 165° C. for 20 minutes to obtain a smooth coated film having a thickness of about 20 microns. The properties of the coated film were all good as shown below.

(1) Solvent wiping resistance (methyl isobutyl ketone): More than 20 times.

(2) Impact strength (Du Pont method): ½ inch, 0.5 kg, more than 50 cm.

(3) Salt spray resistance: more than 1000 houirs.

(4) Accelerated weatherability:

More than 4 cycles (the acelerated weatherability of a conventional commercial cationic electrode-posited coated film was up to 2 cycles).

What is claimed is:

1. A polycarbamic acid ester-type curing agent for thermosetting resin paints, said curing agent containing per molecule at least two groups represented by the following formula

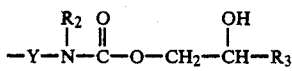   (I)

wherein Y is

$R_2$ and $R_4$, independently from each other, are a hydrogen atom, or an aliphatic hydrocarbon group having 1 to 6 carbon atoms which may be substituted by an amino group, a hydroxyl group or an alkoxy group, or a group of the formula

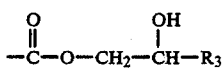

and $R_3$ is a hydrogen atom or a monovalent aliphatic hydrocarbon group having 1 to 6 carbon atoms which may be substituted by a hydroxyl group or an alkoxy group, and said curing agent being composed of the reaction product of (a) a hydrazine containing at least two active hydrogen atoms and being represented by the following formula

wherein $R_4$ is as defined above, (b) a polyepoxide compound having an average molecular weight of 200 to 2,000 and an epoxy equivalent of 100 to 1,000, which is a polyglycidyl ether of a polyphenol, and (c) an alkylene carbonate represented by the following formula

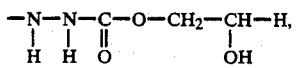

wherein $R_3$ is as defined above.

2. The curing agent of claim 1 which further contains at least one functiional group selected from the class consisting of active amino groups and a hydroxyl group.

3. The curing agent of claim 1 wherein $R_2$ is selected from a hydrogen atom and methyl, ethyl, propyl, isopropyl, hydroxyethyl, aminoethyl and methoxyethyl groups.

4. The curing agent of claim 1 wherein $R_3$ is a hydrogen atom or a methyl group.

5. The curing agent of claim 1 wherein the group of formula (I) is selected from

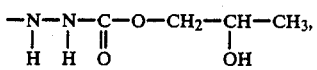

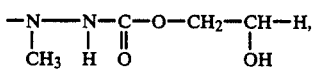

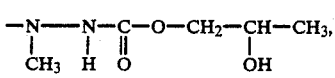

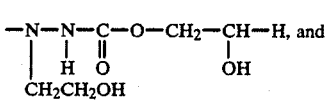

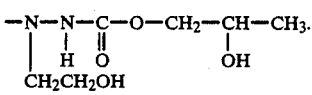

6. The curing agent of claim 1 wherein the hydrazine compound (a) is hydrazine, methylhydrazine or hydroxyethylhydrazine.

7. The curing agent of claim 1 wherein the polyepoxide compound (b) is represented by the following formula

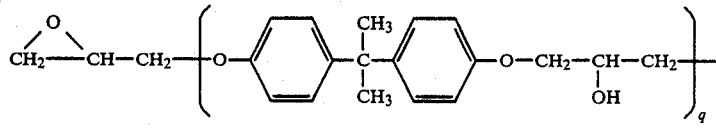

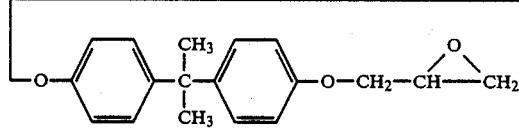

wherein q is 0 to 4.

8. The curing agent of claim 1 wherein the alkylene carbonate (c) is ethylene carbonate or propylene carbonate.

* * * * *